United States Patent

Ullberg

[15] 3,656,824

[45] Apr. 18, 1972

[54] SEALING DEVICE IN BEARING HOUSINGS

[72] Inventor: Carl Woodrow Ullberg, Katrineholm, Sweden

[73] Assignee: Aktiebolaget Svenska Kullager-fabriken, Goteborg, Sweden

[22] Filed: Sept. 16, 1969

[21] Appl. No.: 858,294

[30] Foreign Application Priority Data

Sept. 16, 1968 Sweden..............................12434/68

[52] U.S. Cl..............................308/187.1, 277/66, 277/95
[51] Int. Cl.......................................................F16j 15/32
[58] Field of Search..............277/25, 66, 95, 83; 308/187.1

[56] References Cited

UNITED STATES PATENTS 2,405,122  8/1946  Firth........................................277/95 X
2,912,264  11/1959  Peck........................................308/245 X
3,499,654  3/1970  Lower......................................277/95 X
3,504,917  4/1970  Malmstrom................................277/25

FOREIGN PATENTS OR APPLICATIONS 1,071,374  3/1954  France......................................277/95

Primary Examiner—Robert G. Nilson
Attorney—Howson and Howson

[57] ABSTRACT

A sealing device for bearing housing intended to carry a bearing and a rotatable shaft mounted therein, which housing is divided along a diametrical plane into two halves, characterized thereby that the bore in the side walls of said bearing housing halves through which the shaft passes, is considerably greater than the shaft and internally provided with a ridge or a groove which seals against and acts as a fixing device for the peripheral portion of a side washer which surrounds the shaft and forms a sealing device either alone, together with the shaft or together with another annular member which is arranged around the shaft.

7 Claims, 12 Drawing Figures

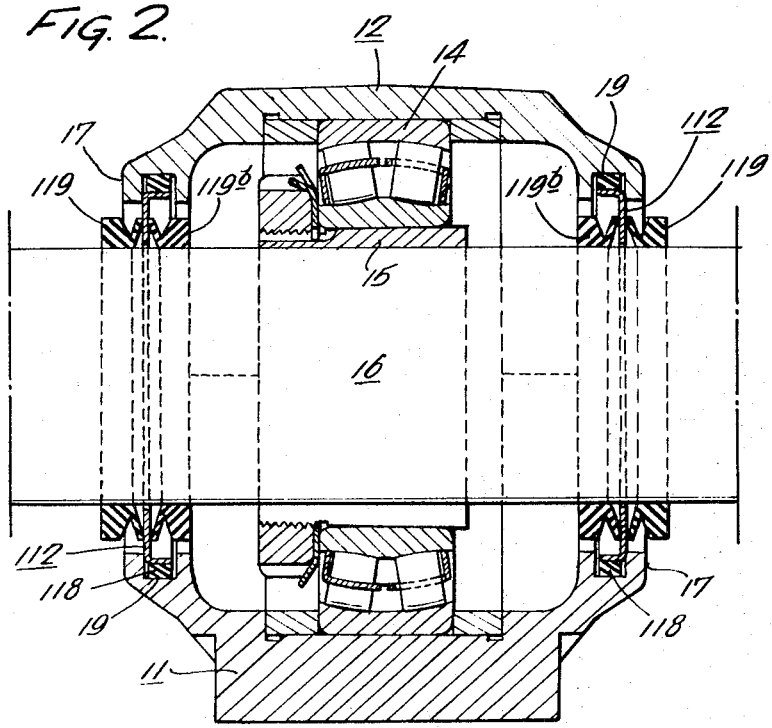
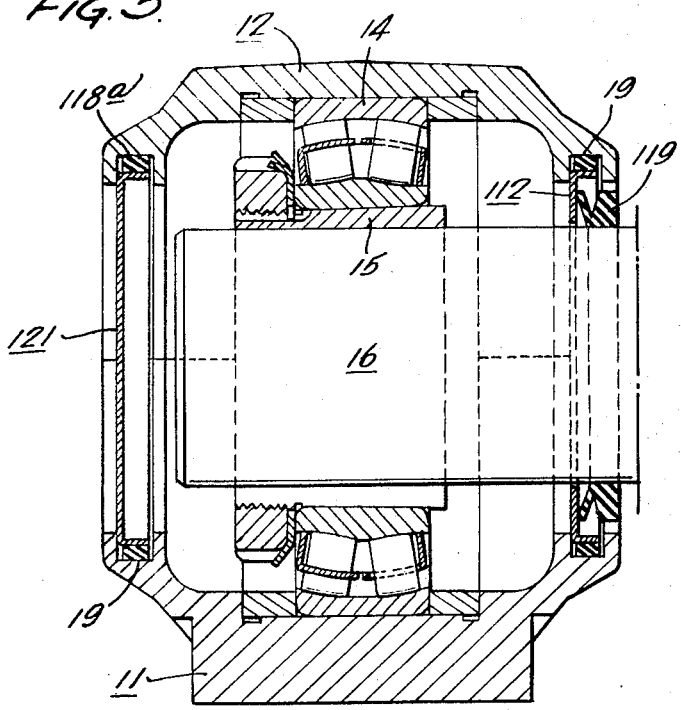
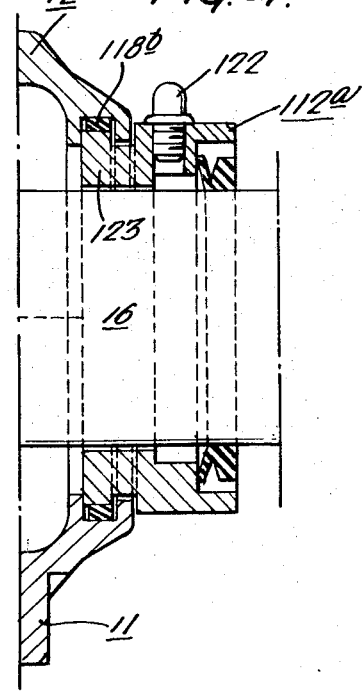

SEALING DEVICE IN BEARING HOUSINGS

The present invention refers to a sealing device in a bearing housing intended to support a bearing and a rotatable shaft mounted therein, whereby said housing is divided along a diametrical plane in two bearing housing halves.

This type of bearing housing is generally used for ball or roller bearings of different types. The bearing housing is commonly sealed off around the through-shaft by means of a felt ring, which are inserted in grooves in one or both walls of the housing.

A disadvantage in this sealing device is that it is hardly accommodated for sealing off liquids. Moreover dust, dirt sand or the like may stick to the felt ring and thereby wear against the shaft, a wear that can be of such an extent that the shaft even may be damaged.

Another drawback in said type of seals is that it for proper function demands a particular pre-treatment, before it is mounted, as it otherwise very soon will lose contact with the shaft, and then only will act as a slot seal.

A further disadvantage is that the felt ring may exert a very high pressure on the shaft during running in, which especially at high speeds will cause an abnormal increase in temperature. It has happened that shafts have been blue-annealed due to the friction against the hard contacting felt ring.

Lately rings of synthetic materials have been tested in order to achieve a better constant contacting force against the shaft. Such synthetic materials are, however, improper from the aspect that they attract dust particles due to the static electricity, which is generated when the shaft rotates. Therefore, it has lately been searched for new ways to attain more efficient sealing devices in bearing housings.

The present invention represents a solution to these problems.

The sealing device according to the invention is characterized thereby that the bore in the side walls of the bearing housing halves, through which the shaft passes, is considerably greater than the shaft and internally provided with a ridge or a groove which seals against and acts as a fixing device for the peripheral portion of a side washer which surrounds the shaft and forms a sealing device either alone, together with the shaft or together with another annular member which may be arranged around the shaft.

In order more thoroughly to explain the idea of the invention, some representative embodiments of the sealing device will be described in the following. It is hereby referred to the drawings attached of which FIG. 1 shows a longitudinal cut through a bearing housing and FIGS. 1b to 1e illustrate the assembly procedure in a bearing housing according to FIG. 1.

FIG. 2 shows a cut through the same bearing housing having a somewhat different shape of the seal.

FIGS. 3 to 7 show other embodiments of the side washer and FIG. 8 shows how the idea of the invention may be applied in double-bearing housings.

Figure 1:
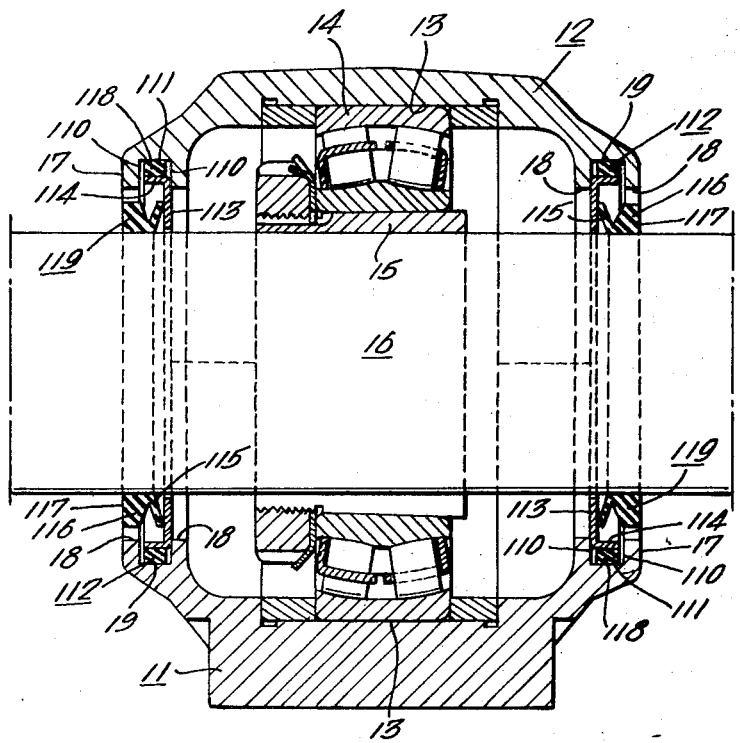

In the figures the lower half of a so-called plummer block is designated 11 and the upper half 12. The halves are provided with a bearing seat 13 for a spherical roller bearing 14, which by the aid of a clamping sleeve 15 is secured to the shaft 16. The shaft 16 passes through bores 18 in the side walls 17 of the housing, said bores being substantially concentric to the shaft. In the inner sides of the bores there are grooves 19, which are limited by two annular surfaces 110 and a cylindrical surface 111. In the groove is fitted a side washer 112, comprising a plane annular disc 113 and an envelope surface 114, attached to the periphery of the disc. The side washer has in other words a section of L-shape. Around the envelope surface 114, a rubber ring 118 has been fitted by vulcanization task cementing or in some other suitable way. The task of the rubber ring is to secure a static sealing off between the side washer 112 and the walls of the groove 19. The rubber ring 118 is then in mounted state compressed between the envelope surface 114 and the cylindrical surface 111. The external surface of the side washer 112 contacts axially against a sealing lip 115 of rubber, which at its inner portion is integral with a body portion 116 of rubber. The external surface 117 of the body portion is in plane with the side wall of the bearing housing.

Figure 1B:
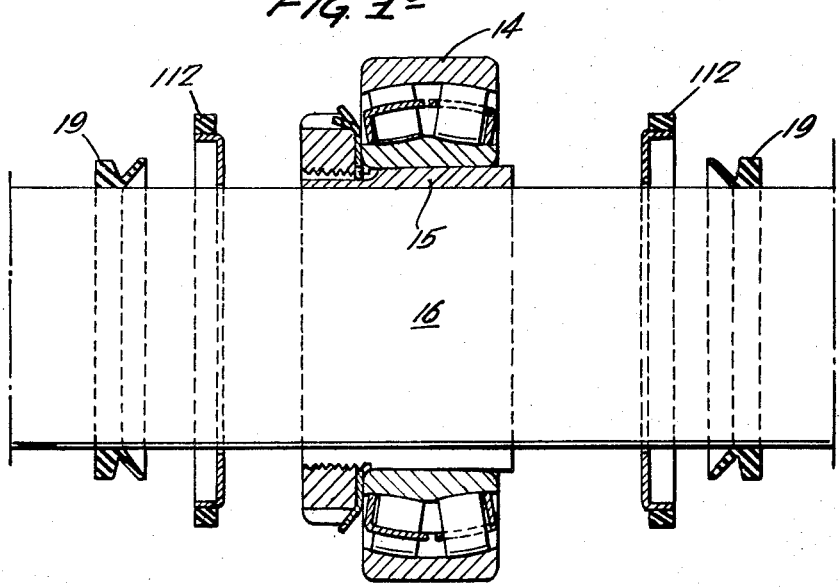
Figure 1C:
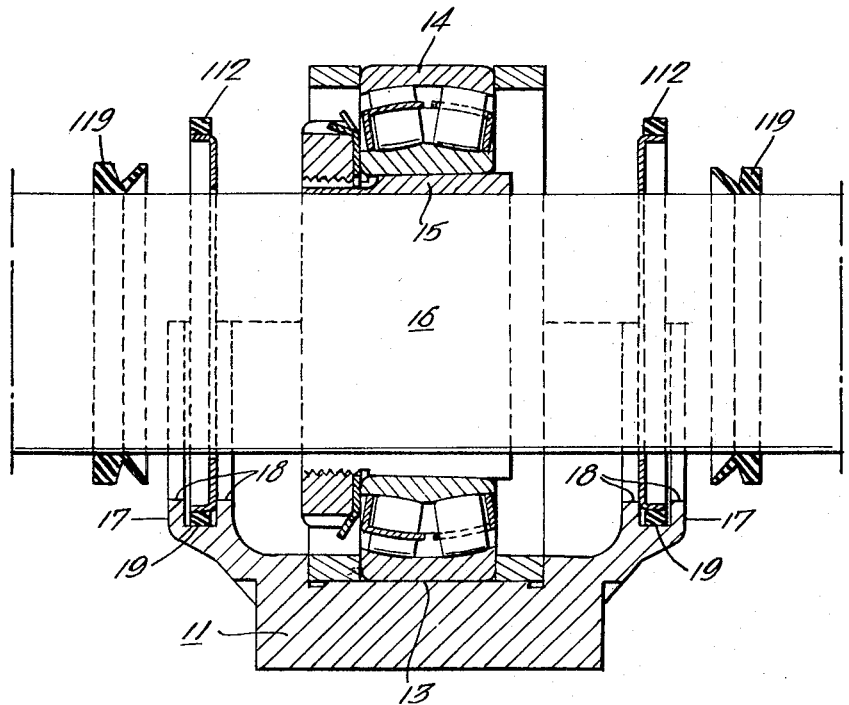
Figure 1D:
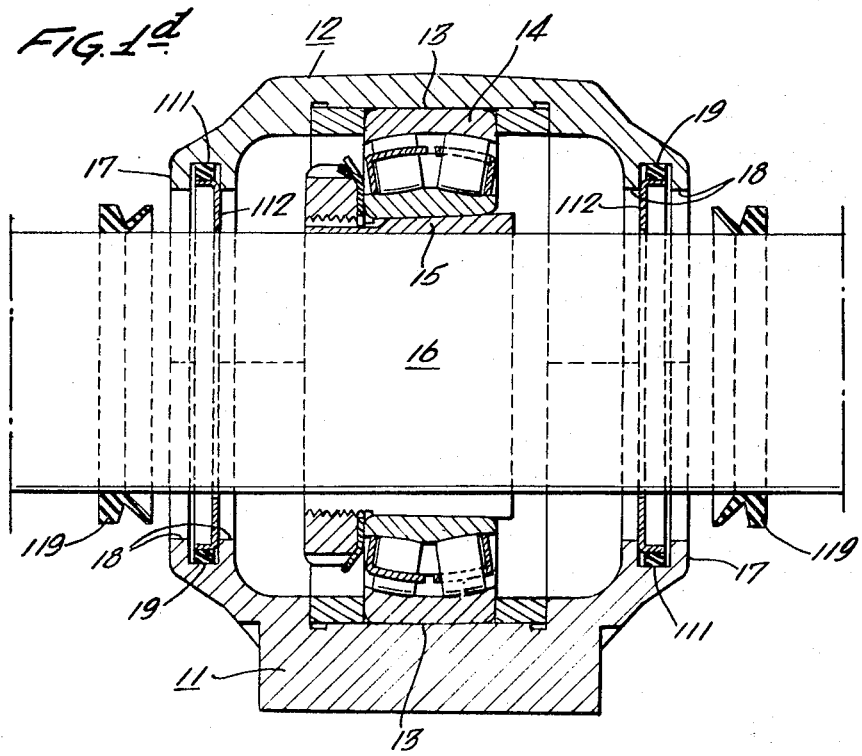
Figure 1E:
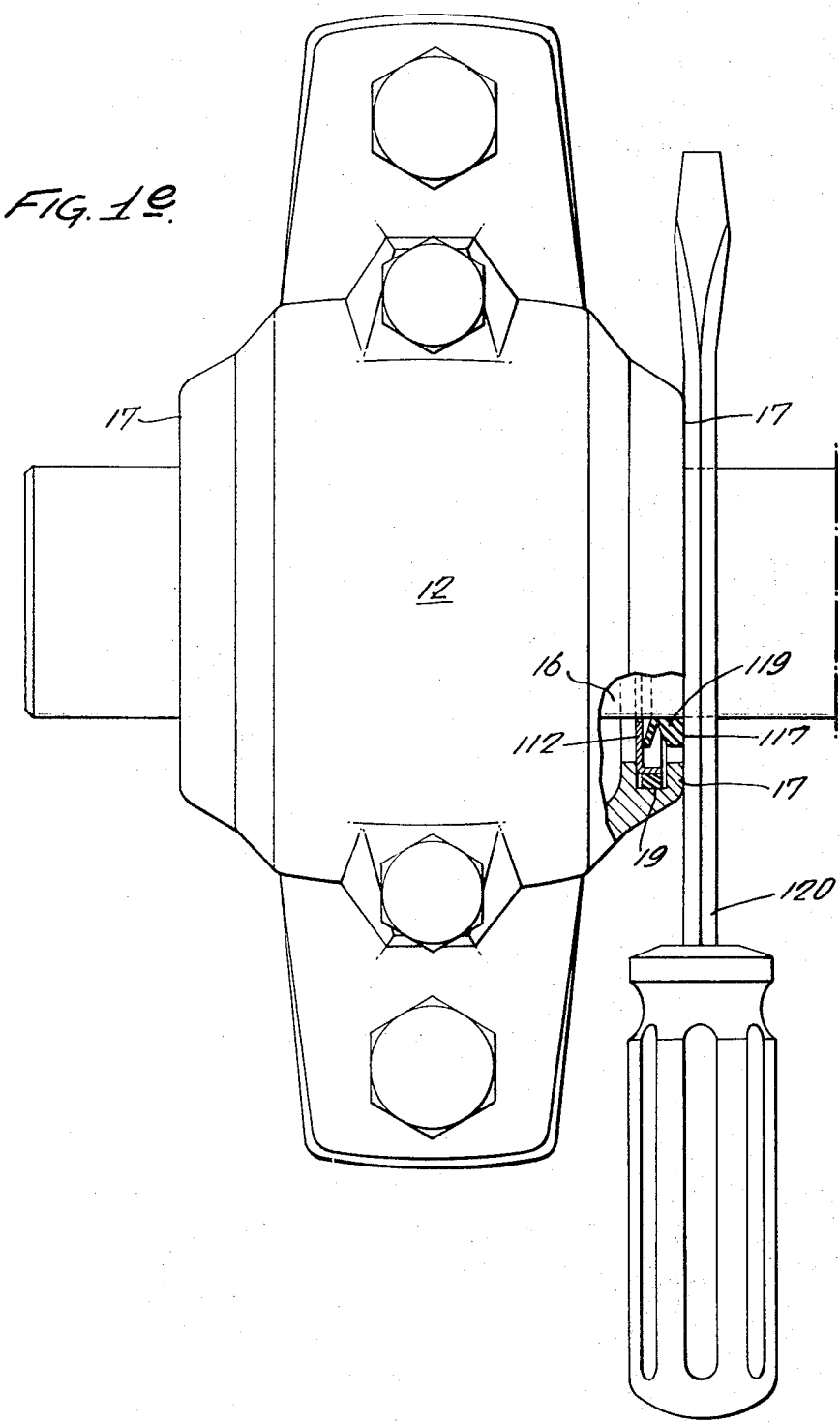

Assembly of a bearing housing according to FIG. 1 takes place as is schematically described in FIGS. 1b to 1e. FIG. 1b shows the bearing 14 secured to the shaft 16 by a clamping sleeve 15, said shaft having two side washers 112 threaded thereupon, one on each side of the bearing. Outside the washers there are seals 119, which as mentioned above comprise a body portion 116 and a lip 115. FIG. 1c shows the next step in the assembly. The shaft 16 arranged as shown in FIG. 1b, is put in the lower bearing housing half 11. It is noted that the spacer rings (not numbered) on either side of the bearing are also assembled at this time (see FIG. 1c). The side washers 112 are fitted into the grooves 19, in the side walls 17. The upper bearing housing half 12 is put in its place in the next step of the assembly operation as shown in FIG. 1d. By aid of screws (not shown in the drawings), the two halves are screwed against each other, whereby the rubber rings 118 are compressed and makes a static seal for the side washers 112. FIG. 1e illustrates how the sealing rings 119 are mounted in accurate position. This is carried out so that the sealing ring during rotation of the shaft 16 is forced in against the side washer by the aid of an appropriate tool, e.g. a screw-driver 120. When the axially external surface 117 of the sealing ring is in plane with the side wall 17 of the housing the sealing ring has reached its proper sealing position.

The simple sealing device described in connection to FIGS. 1 to 1e, may be improved by a further sealing ring 119 b, located within the very bearing housing. The task of this further sealing ring is to prevent leakage of oil. This sealing device is thus only used when it is necessary to prevent lubricants in liquid form to escape from the bearing housing. Due to space motives it may then be appropriate to turn around the side washer 112 as shown in FIG. 2. Usually some of the simplicity of the assembly is however hereby lost as it is necessary to use some sort of measurement to determine the accurate position of the sealing ring 119 relative to the side washer 112.

It is common that a bearing housing of the actual type supports a shaft end. As such bearing housings conventionally have been provided with felt ring seals arranged in both side walls, the shaft has usually been allowed to pass through both of those walls. This implies of course a great risk that the bearing will be contaminated. The sealing points are hereby two instead of one, which is theoretically possible, and air may easier pass through the bearing as there are air slits at each side of the bearing.

This circumstance has been taken into consideration when developing the present invention. As shown in FIG. 3, the side washer may on one side of the bearing be substituted by a leakproof cover 121, the peripheral portion of which is designed exactly as the peripheral portion of the side washer 112, i.e. with an external rubber ring 118a. The above disadvantages thus are completely eliminated. The number of sealing points is reduced by 50 percent and the risk of percolation is totally eliminated.

The side washer may be given several different shapes. FIG. 4 shows how it has been arranged to act as a lubricating device. A lubricant nipple 122 is screwed into the side washer 112a, which is made of homogeneous material, and is attached to the bearing housing in the same manner as the side washer in the embodiments earlier described, i.e. by the two bearing housing halves being squeezed together around a collar 123, the periphery of which is surrounded by a rubber pad 118b. By aid of the lubricating device the bearing as well as the seal may be lubricated.

Figure 5:
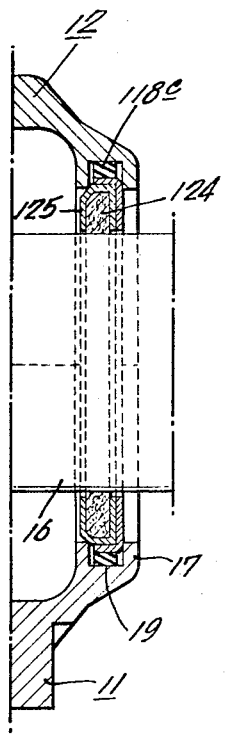

As mentioned in the ingress, the invention is not limited to a sealing device comprising two elements, i.e. a side washer and a rubber seal. The sealing device may also be a single part, which is so designed that it seals directly against the shaft. FIG. 5 shows such an embodiment, where the sealing member is a felt ring 124 fitted in a sheet metal holder 125, the periphery of which is surrounded by a rubber pad 118c.

Figure 6:
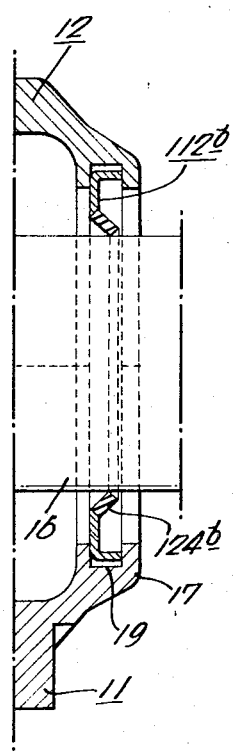

FIG. 6 shows a somewhat modified embodiment of the side washer which in this case comprises a holder 112b, which in its inner portion is provided with a vulcanized rubber lip 124b which sealingly contacts the shaft.

Figure 7:
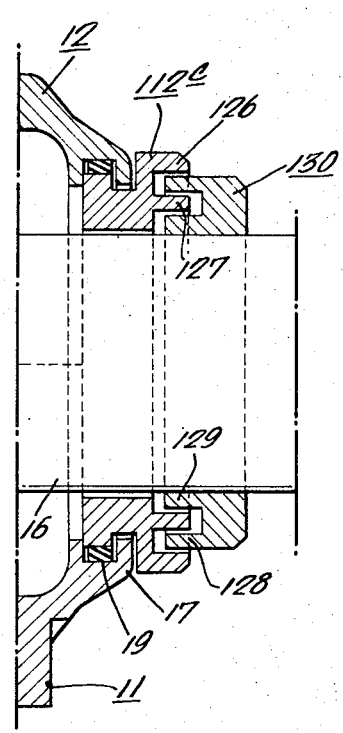

FIG. 7 represents an embodiment of the sealing device, which comprises two annular members which are so designed that they together form a labyrinth. A side washer 112c attached to the side wall of the bearing housing in a manner earlier described, is provided with two outwardly extending annular portions 126, 127. Cooperating with these there are two in the opposite direction extending annular portions 128, 129 arranged on a metal ring 130, which is fitted to the shaft.

As hereinbefore has been mentioned a reduced number of sealing points implies an improved bearing assembly also thereby that the risk of contamination of the bearing is reduced. Therefore, so-called double-bearing housings have been developed which comprise one rolling bearing in each end of the same bearing housing. This involves of course an extra cost especially regarding storekeeping as it is necessary not only to keep the standard bearing housings in stock but also special double-bearing housings.

Figure 8:
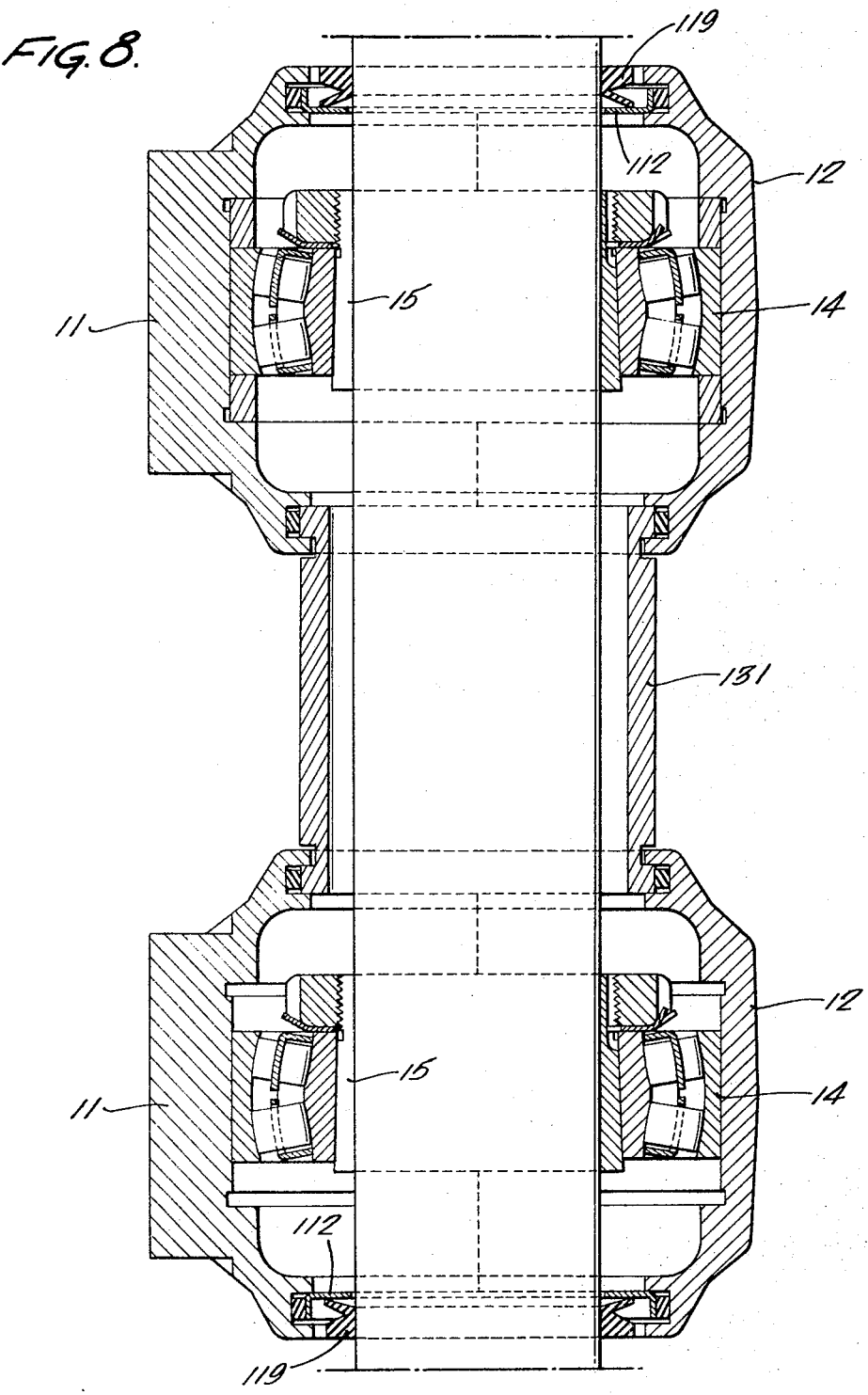

According to the present invention it is, however, possible to combine two bearing housings in such a manner as shown in FIG. 8. The bearing housings are connected by a tube 131 which at both ends is provided with a fixing device as has earlier been described. The advantage with this arrangement is not only that the double-bearing housings may be substituted by pairs of bearing housings according to the invention but there is also a large gain in that by using different lengths of the tube 131 it is possible to meet any demand from the customer as to different axial assembly measures.

The invention adopts firstly a sealing device for bearing housings, but because this sealing device may be designed in different ways not only regarding shape but also regarding dimensions, the invention also includes a bearing housing which is equipped with a sealing device as described. Such a bearing housing may be manufactured in series so that it may be used for different types and dimensions of bearings intended for different shaft diameters. One bearing housing may thereby merely by substitution of the sealing device be used for a great number of bearing and shaft dimensions. This implies an enormous gain from economical aspects, as four different plummer block series may be substituted by only one.

I claim:

1. In combination, a rotatable shaft member, a bearing assembly mounted on said shaft member, a housing enclosing said bearing assembly divided along a diametrical plane into two halves, said housing having an opening at least at one axial end of a greater diameter than the shaft and having an annular groove formed therein, a seal assembly comprising a side washer of L-shaped configuration mounted in said groove consisting of an annular disc portion extending transversely to the shaft and an envelope portion confronting the groove and extending transversely to the disc portion, a resilient annular member mounted on said envelope portion under compression in said groove thereby providing a static seal and at least one sealing ring of resilient material mounted on said shaft having a flexible lip engaging the annular disc portion of said side washer.

2. The combination as claimed in claim 1 characterized thereby that the lip of the sealing ring contacts axially against the external surface of the annular disc portion of the side washer, whereby the axial external surface of the sealing ring is in plane with the side wall or the outer portion of the side washer, in order to facilitate the decision of the accurate location of the sealing ring relative to the sealing surface.

3. The combination as claimed in claim 1 characterized thereby that the side washer acts as a fixing device for a radial seal, the lip of which contacts the shaft.

4. The combination as claimed in claim 1 thereby that the side washer is provided with a device for additional lubrication of the bearing or the seal.

5. The combination as claimed in claim 1 characterized thereby that the housing is so designed that bearings intended for different shaft diameters may be used merely by substituting the side washer and eventually another on the shaft mounted member.

6. The combination as claimed in claim 1 wherein said housing is provided with annular grooves at opposite axial ends to accommodate a seal assembly at opposite axial ends.

7. The combination as claimed in claim 1 wherein said housing is provided with a groove at opposite axial ends, a seal assembly at one axial end of said housing, and a cover member mounted in said groove at the opposite end of said housing.

* * * * *